(12) United States Patent
Govindasamy

(10) Patent No.: US 7,899,838 B1
(45) Date of Patent: Mar. 1, 2011

(54) BUSINESS RULES PREPROCESSING

(75) Inventor: Sekar Govindasamy, Tampa, FL (US)

(73) Assignee: Perot Systems Corporation, Plano, TX (US)

( * ) Notice: Subject to any disclaimer, the term of this patent is extended or adjusted under 35 U.S.C. 154(b) by 332 days.

(21) Appl. No.: 11/209,307

(22) Filed: Aug. 23, 2005

Related U.S. Application Data

(63) Continuation of application No. 10/828,606, filed on Apr. 21, 2004, now abandoned.

(51) Int. Cl.
 *G06F 17/30* (2006.01)
(52) U.S. Cl. ....................................... 707/760
(58) Field of Classification Search ........................ None
 See application file for complete search history.

(56) References Cited

U.S. PATENT DOCUMENTS

| | | | |
|---|---|---|---|
| 6,016,477 A | 1/2000 | Ehnebuske et al. | |
| 6,330,594 B1 * | 12/2001 | Swart | 709/219 |
| 6,473,748 B1 | 10/2002 | Archer | |
| 6,574,635 B2 | 6/2003 | Stauber et al. | |
| 6,651,142 B1 | 11/2003 | Gorelik et al. | |
| 6,714,962 B1 | 3/2004 | Helland et al. | |
| 6,745,381 B1 | 6/2004 | Ehnebuske et al. | |
| 6,745,382 B1 | 6/2004 | Zothner | |
| 6,775,658 B1 | 8/2004 | Zothner | |
| 7,440,961 B1 * | 10/2008 | Matousek | 707/101 |
| 2003/0014552 A1 * | 1/2003 | Vaitheeswaran et al. | 709/312 |
| 2003/0097286 A1 * | 5/2003 | Skeen | 705/7 |
| 2003/0120619 A1 * | 6/2003 | Osborn | 706/19 |
| 2003/0208493 A1 * | 11/2003 | Hall et al. | 707/100 |
| 2004/0162855 A1 * | 8/2004 | Nagy et al. | 707/104.1 |
| 2005/0015264 A1 * | 1/2005 | Mutchler | 705/1 |

* cited by examiner

*Primary Examiner*—Don Wong
*Assistant Examiner*—Belinda Xue
(74) *Attorney, Agent, or Firm*—Winstead PC

(57) ABSTRACT

A method and system reducing tier-to-tier movement of data in a multi-tiered architecture is disclosed. Rules from a first tier of the architecture are converted to SQL and transferred to a second tier that stores data.

20 Claims, 6 Drawing Sheets

BUSINESS RULES PREPROCESSING

This patent application is a continuation of U.S. patent application Ser. No. 10/828,606, filed on Apr. 21, 2004 now abandoned. This patent application incorporates by reference the entire disclosure of U.S. patent application Ser. No. 10/828,606.

BACKGROUND OF THE INVENTION

1. Technical Field

The present invention generally relates to multi-tiered architectures, and more particularly, but not by way of limitation, to a method of and system for transmitting transformed business rules from a business rules tier to a database tier for evaluation.

2. History of the Related Art

Multi-tiered infrastructures are implemented to provide a physical division of the infrastructure across, for example, desktop, local server, and central server processing nodes. As shown in FIG. 1, in a multi-tier architecture 100, there are three or more interacting tiers, each with its own specific responsibilities. A client tier 102 may include presentation logic, including simple control and user input validation. A mid-tier 104, which may also be known as the application server, provides business processes logic and data access. A data server tier 106 provides business data.

Multi-tier business rule processing currently requires, to evaluate each rule, large amounts of data to be fetched from the data server 106 and fed into a rules engine of the mid-tier 104. The moving of large amounts of data from one tier to another may increase time and processing required to evaluate a business rule set. Additionally, moving data between tiers may bottleneck the network layer and demand a large memory at the middle tier.

BRIEF SUMMARY OF THE INVENTION

The present invention relates to a method for preprocessing business rules. The method includes translating at least one business rule into Structured Query Language (SQL), transmitting the SQL to a database tier to act on data of the database tier, and evaluating the data based on the SQL in the database tier In another aspect, the present invention relates to a system for preprocessing rules. The system includes a business rules module for storing at least one business rule, a data manager for translating the at least one business rule to Structured Query Language (SQL), and a query data service for transmitting the SQL to a database tier. Evaluation of the SQL against data of the database tier occurs at the database tier.

BRIEF DESCRIPTION OF THE DRAWINGS

For a more complete understanding of the present invention, and for further objects and advantages thereof, reference is made to the following description taken in conjunction with the accompanying drawings in which.

DETAILED DESCRIPTION OF THE INVENTION

Embodiments of the present invention preprocess business rules into Structured Query Language (SQL) and transmit the SQL to a database tier, thereby reducing tier-to-tier movement of data. For example, a user may set up a rule to send correspondence to individuals with a specific zip code. In a traditional business rule implementation, all member records are retrieved from the database tier and moved to the mid-tier for processing a zip code match. Instead, according to embodiments of the present invention, rule matching is executed in the same tier in which data is stored, alleviating the need to move potentially large amounts of data to another tier.

Figure 1:
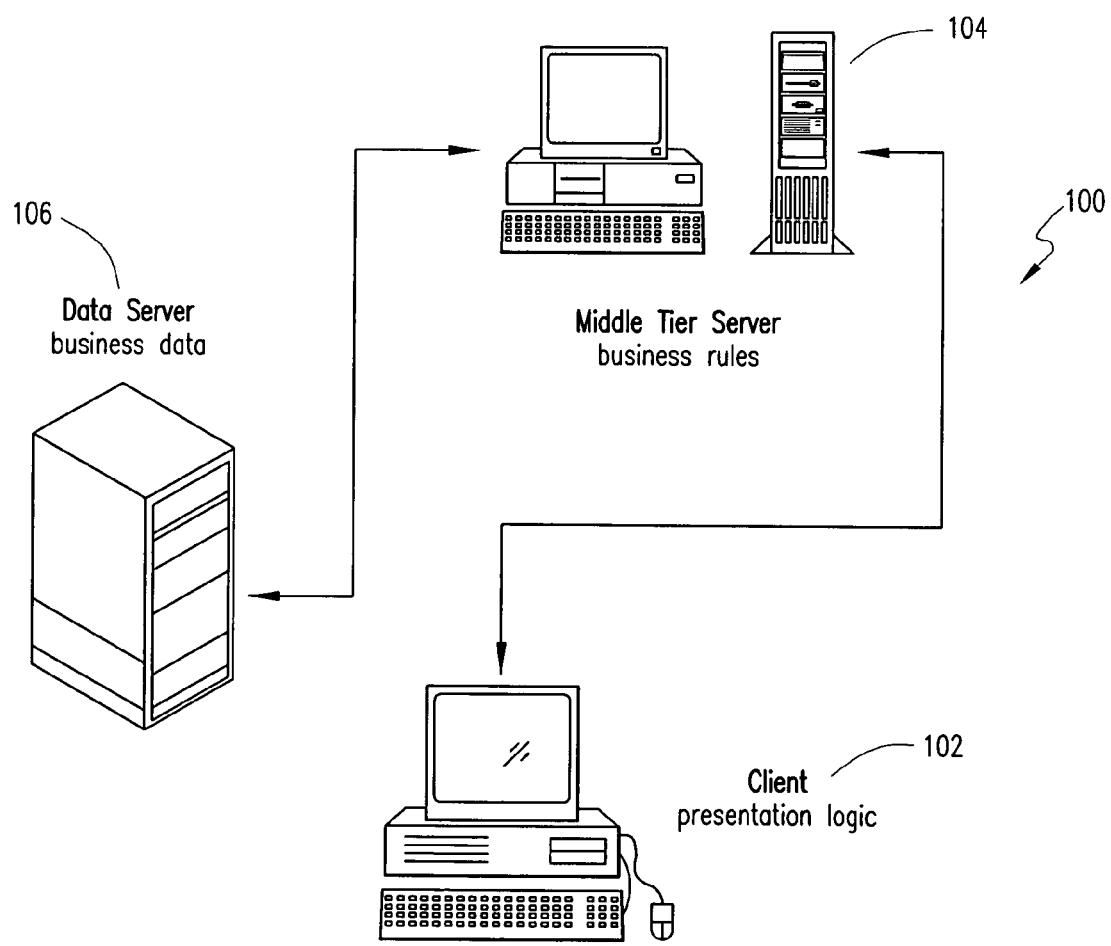
FIG. 1 is a block diagram of a multi-tiered architecture.
Figure 2:
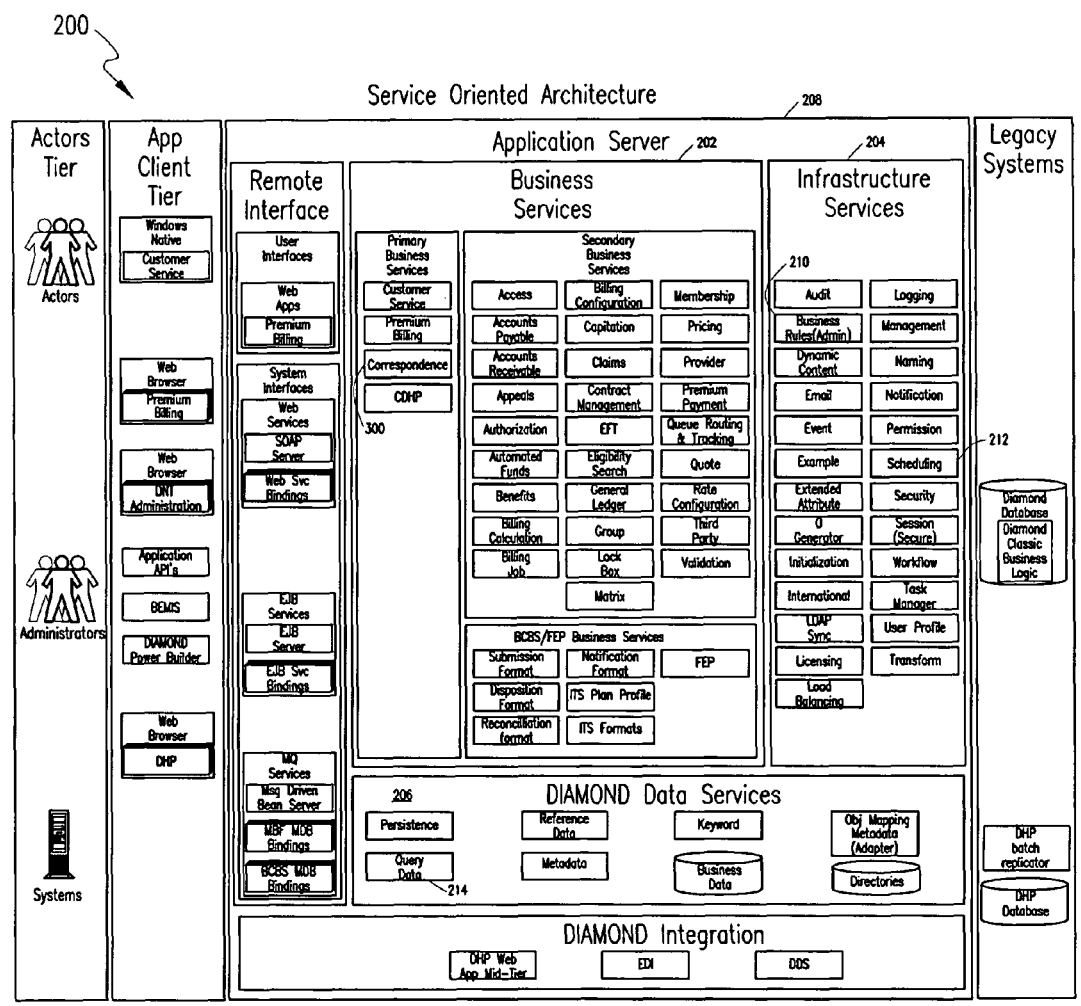
FIG. 2 is a block diagram of a multi-tiered architecture in accordance with an embodiment of the present invention.

Referring now to FIG. 2, a multi-tiered architecture in accordance with an embodiment of the present invention is illustrated. Services offered by the architecture 200 include business, infrastructure, and data services as shown in the business services tier 202, infrastructure services tier 204, and data services tier 206 respectively. Each business service of the business services tier 202 may be application specific and encapsulate business logic. An infrastructure service, such as those illustrated in the infrastructure services tier 204, may be a general purpose, horizontal service that may not be application specific and does not have business logic. The data services tier 206 relates to services that are general purpose and related to data access. Access to the data may be either read-only or read-write in nature. Although the architecture is illustrated with specific tiers, applications, modules, databases, etc., it will be understood by one skilled in the art that the multi-tier architecture may be have various different tiers, etc. not illustrated in FIG. 2. In addition, the mid-tier, or application server 208, is capable of numerous different deployment configurations and therefore the configuration, as illustrated in FIG. 2, is merely exemplary in nature.

The infrastructure services tier 204 includes a business rules module 210 from which business rules are transferred to a correspondence module 300 to act on the data. The business rules may be set up in a similar manner to database rules, e.g., WHERE class conditions. The business rules may be converted to SQL and sent to the database tier through a Query Data Service 214. The database may then evaluate the business rules against data stored within the database to determine if the business rules are met or not, as described in more detail below. Metadata Service may be used to find Primary Key information and map a Concept/Attribute to a Table/Column.

Figure 3:
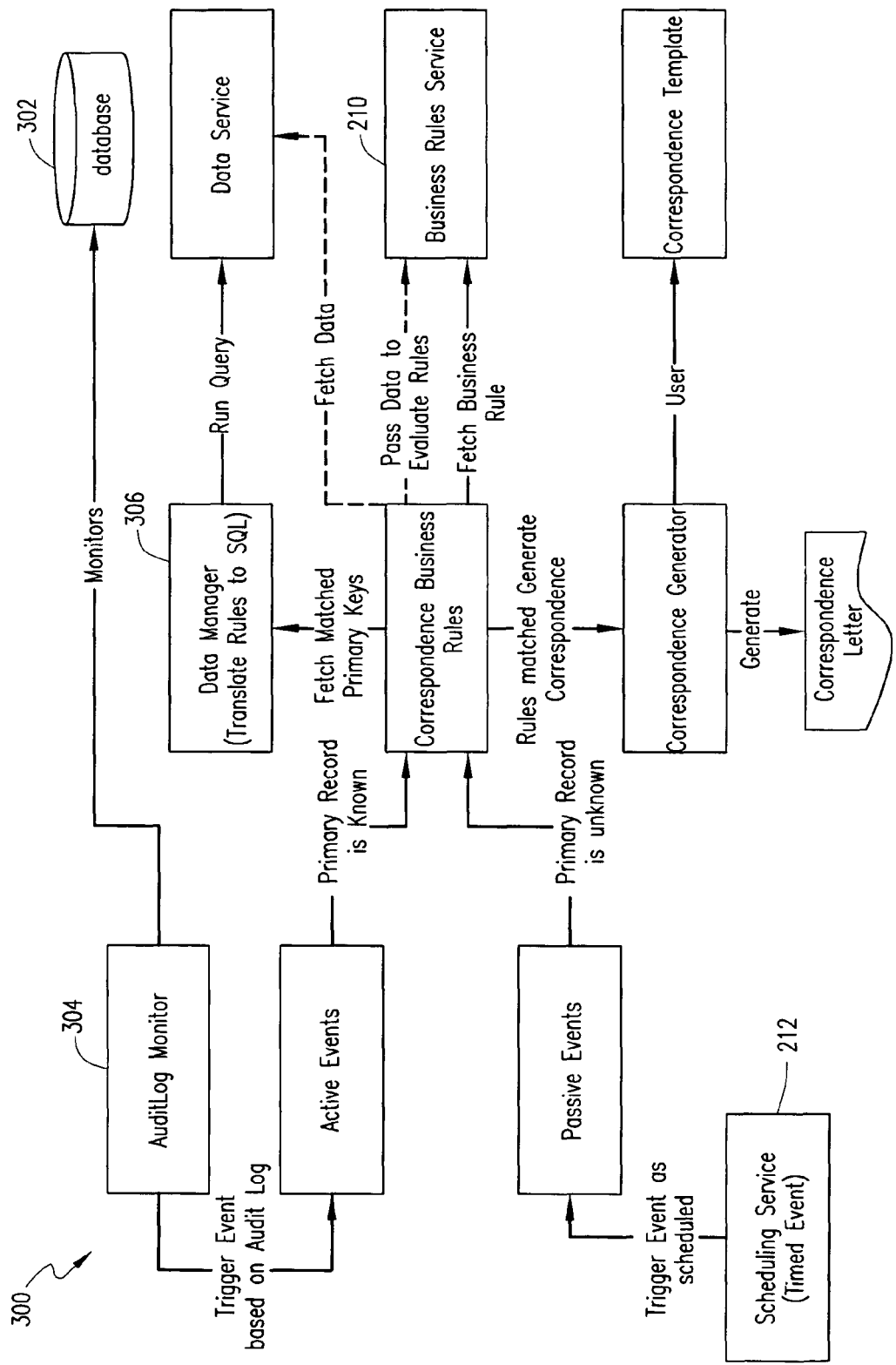
FIG. 3 is a system diagram illustrating the flow of data in accordance with an embodiment of the present invention.

Referring now to FIG. 3, a block diagram for a correspondence module 300 illustrates the flow of data in accordance with an embodiment of the present invention. As previously mentioned, in prior art systems, data is fetched from a database 302 and passed to the business rules service 210 in order for the data to be evaluated (indicated by dashed arrows). The business rules service 210 includes rules that identify a concept (e.g., a table), an attribute (e.g., a column), and a set of values with a relational operator. In addition, multiple rules may be combined together using logical operators. For a given set of data, if the rules are satisfied, then a correspondence letter may be generated using the data and a correspondence template.

In accordance with an embodiment of the present invention, data is not fetched from the database 302. Instead, rules are fetched from the business rules service 210 (thick arrow) and translated to an SQL query at a Data Manager 306. The Data Manager then passes the query to the database 302.

Based on the query, only the matched Primary Key values are fetched to the mid-tier instead of thousands of data records. In the present embodiment, a user may specify correspondence events that trigger correspondence generation. The correspondence events may be either passive or active events. An active event is triggered when a change is made to a table in the database 302. An AuditLog monitor 304 determines when a change has been made to a table and triggers an active event to process as described in detail in FIG. 5.

Passive events are triggered periodically by the scheduling service 212 and do not require a change to a database table. Data flow in accordance with passive event processing is described in detail with reference to FIG. 6. Although this diagram is illustrated as executing in a correspondence module, embodiments of the present invention are applicable to various other modules implementing utilizing a rules service.

Figure 4:
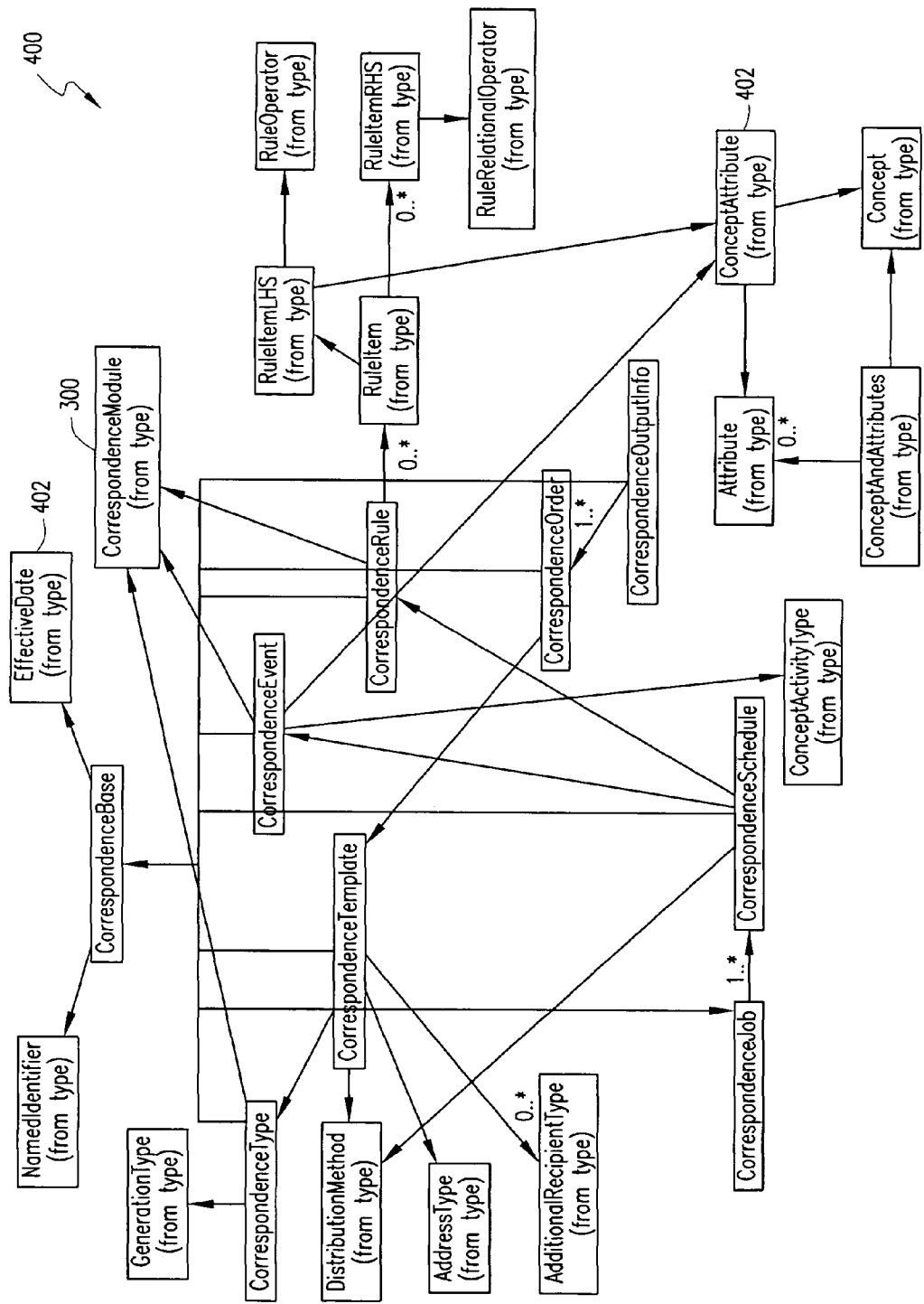
FIG. 4 is a class diagram in accordance with an embodiment of the present invention.

Referring now to FIG. 4, a class diagram 400 in accordance with an embodiment of the present invention is illustrated. The class diagram 400 illustrates various objects 300, 402 that are involved in the implementation of an embodiment of the present invention. The relationships between the objects 300, 402 are illustrated via arrows. The class diagram represents the user input to setup a correspondence generation. A Correspondence Schedule 512 associates a Correspondence Type, Correspondence Event, and Correspondence Rule together. The Correspondence Rule has zero or more rule items and each rule item has a left and right hand side of a rule. The left hand side of a rule identifies a concept and attribute pair while the right hand side includes literal values and equates to the right hand side with a relational operator.

Figure 5:
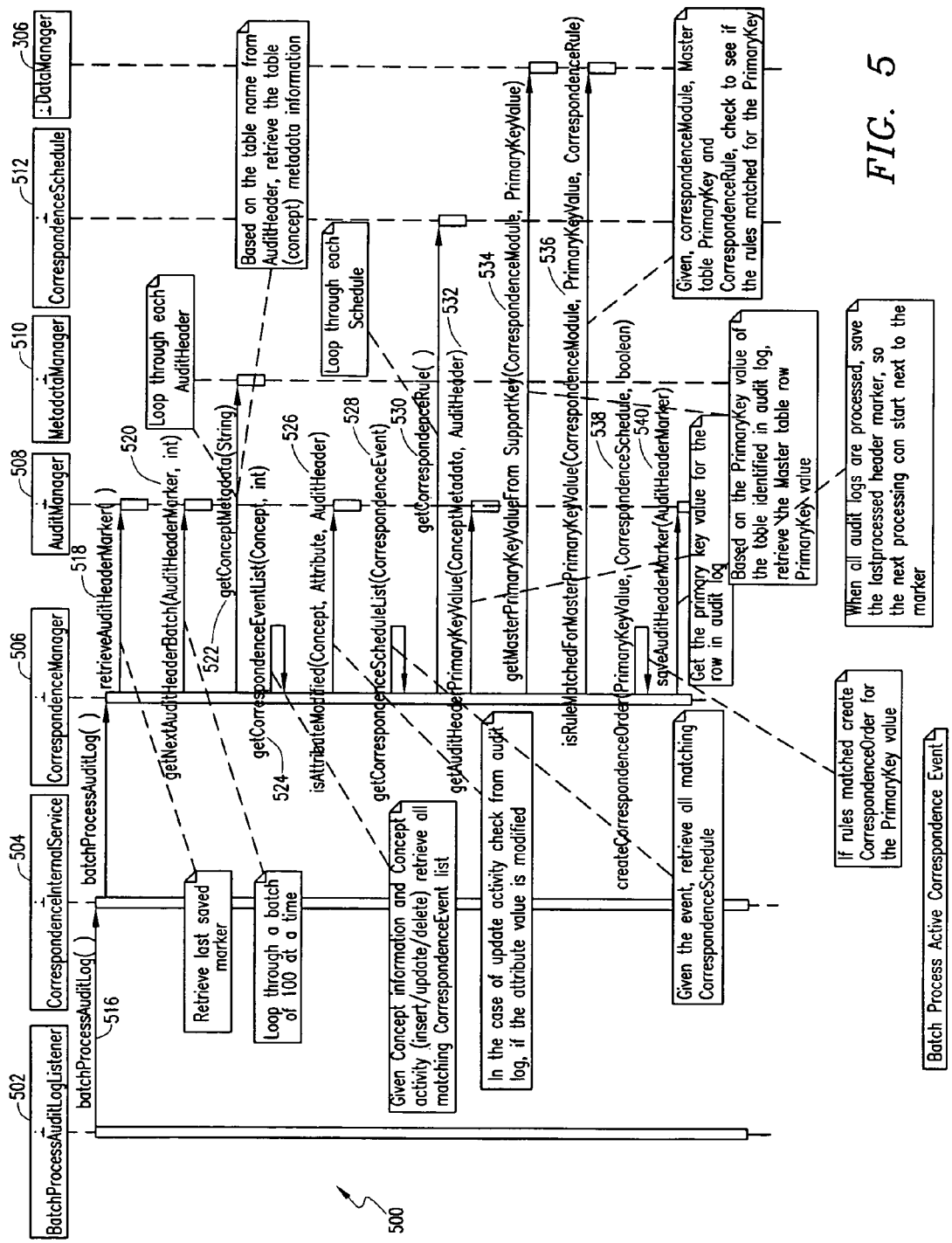
FIG. 5 is a sequence diagram of active event processing in accordance with an embodiment of the present invention.

Referring now to FIG. 5, a sequence diagram 500 of active event processing in accordance with an embodiment of the present invention is illustrated. Active event processing entails modifying data by a user, and when the data is modified, the data is marked in an AuditLog that triggers the event to process. Involved in evaluating business rules are a Batch Process Audit Log Listener 502, a Correspondence Internal Service 504, Correspondence Manager 506, Audit Manager 508, a Metadata Manager 510, a Correspondence Schedule 512, and the Data Manager 306. The Batch Process Audit Log Listener 502 is triggered, as noted above, to send a batchProcessAuditLog message 516 through the Correspondence Internal Service 504 to the Correspondence Manager 506. The batchProcessAuditLog message 516 triggers a retrieveAuditHeaderMarker message 518 for retrieving the last saved marker from the Audit Manager 508. Data is continued to be retrieved by a getNextAuditHeaderBatch message 520. The getNextAuditHeaderBatch message 520 loops through a batch of, for example, 100 pieces of data at a time. Each AuditHeader is looped through at initiation of a getConceptMetadata message 522 sent from the Correspondence Manager 506 to the Metadata Manager 510. Each AuditHeader lists a table name and, based on the listed table name, the table metadata is retrieved from the Metadata Manager 510.

The Correspondence Manager 506 retrieves, via a getCorrespondenceEventList message 524, a matching correspondence event list based on given concept information and concept activity (e.g., insert, delete, update, etc.). An isAttributeModified message 526 is transmitted from the Correspondence Manager 506 to the Audit Manager 508 to determine if, in the case of an update activity, an attribute is modified. A getCorrespondenceScheduleList message 528, initiated at the Correspondence Manager 506, retrieves the matching Correspondence Schedules 512. A getCorrespondenceRule message 530 is sent from the Correspondence Manager 506 to each matching Correspondence Schedule 512 to retrieve rules associated with each Correspondence Schedule 512.

A getAuditHeaderPrimaryKeyValue message 532 is generated by the Correspondence Manager 506 and sent to the Audit Manager 508 in order to retrieve the primary key value for a row in the AuditLog. Once the primary key value has been retrieved, the Correspondence Manager 506 transmits a getMasterPrimaryKeyValueFromSupportKey message 534 to the Data Manager 306. Based on the primary key value of the table in the AuditLog, a master table row primary key value is retrieved. The Correspondence Manager 506 then sends an isRuleMatchedForMasterPrimaryKeyValue message 536 to the Data Manager 306. This message 536 checks to determine if the rules match for the primary key based on the Correspondence Module 300, master table primary key, and the Correspondence Rule. If the rules match, then a correspondence order is created via a createCorrespondenceOrder message 538. When the processing for each AuditLog is completed, the last processed header marker is saved so that the next event processed may start at the last processed header marker. The last processed header marker is saved via a saveAuditHeaderMarker message 540 created by the Correspondence Manager 506.

Figure 6:
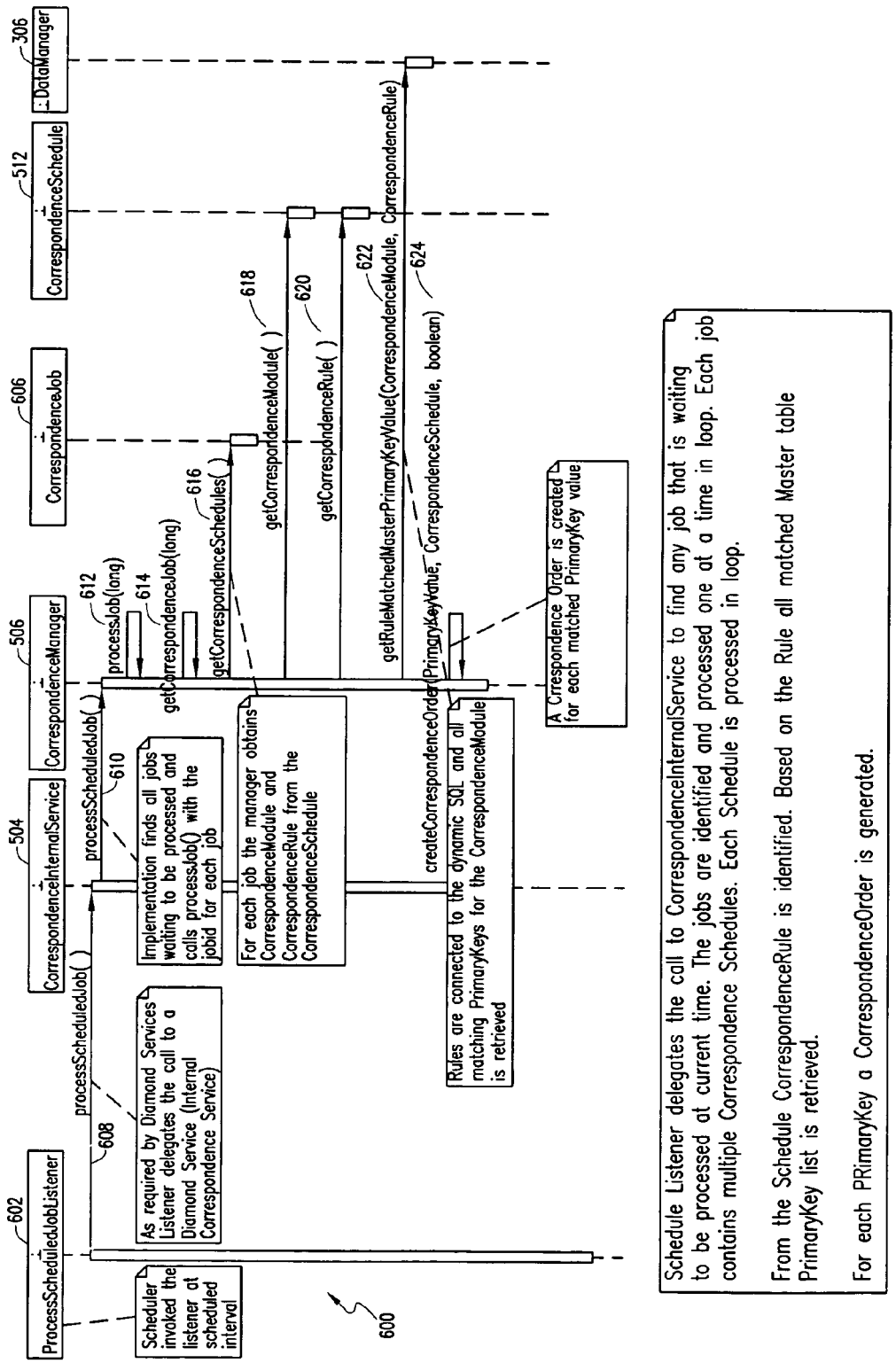
FIG. 6 is a sequence diagram of passive event processing in accordance with an embodiment of the present invention.

Referring now to FIG. 6, a sequence diagram of passive event processing in accordance with an embodiment of the present invention is illustrated. Instead of processing events in an active manner, events may be processed at a predetermined scheduled time as noted above. The sequence may be initiated by a processScheduledJob message 608 from a Process Scheduled Job Listener 602 that is invoked at predetermined intervals by the Scheduling Service 212. The processScheduledJob message 608 delegates any job waiting for execution to the Correspondence Internal Service 504. The Correspondence Internal Service 504 creates a processScheduledJob message 610 that is, in turn, sent to the Correspondence Manager 506. The processScheduledJob message 610 finds jobs waiting to be processed and calls each job one at a time in a loop. The Correspondence Manager 506 creates a processJob message 612 to initiate processing of a waiting job. A getCorrespondenceJob message 614 aggregates multiple correspondence schedules to be executed as a background job. Each Correspondence Schedule 512 is determined for the waiting job via a getCorrespondenceSchedules message 616 sent to a Correspondence Job 606. The Correspondence Manager 506 obtains correspondence module and correspondence rule information from each Correspondence Schedule 512 via a getCorrespondenceModule message 618 and a getCorrespondenceRule message 620. The Correspondence Manager 506 creates a getRuleMatchedMasterPrimaryKeyValue message 622, which is sent to the Data Manager 306, to initiate conversion of the rules to dynamic SQL. The matching primary keys for the correspondence module are retrieved also. The Correspondence Manager 506 creates a createCorrespondenceOrder message 624 for each matched primary key value.

Although the above embodiments have been illustrated with reference to generating a correspondence order, it will be understood that various modifications maybe made to implement embodiments of the present invention with any business rule that relies on data in a data server for rule evaluation.

It is thus believed that the operation and construction of embodiments of the present invention will be apparent from the foregoing description. While the method and apparatus shown or described have been characterized as being preferred, it will be obvious that various changes and modifications may be made therein without departing from the spirit and scope of the invention.

What is claimed is:

1. A method for preprocessing business rules, the method comprising the steps of:
   in a multi-tier architecture comprising a client tier, a middle tier and a database tier, at the middle tier, translating at least one business rule into a Structured Query Language (SQL) query;
   transmitting, via a query data service, the SQL query from the middle tier to the database tier to act on data of the database tier, wherein the SQL query comprises the translated at least one business rule;
   at the database tier, evaluating the data of the database tier based on the SQL query to determine whether the at least one business rule is satisfied;
   returning information indicative of the evaluating step from the database tier to the middle tier; and
   wherein the middle tier and the database tier are physical divisions of the multi-tier architecture across a computer network, the middle tier and the database tier each comprising one or more server computers.

2. The method of claim 1, wherein the step of translating comprises translating at least one business rule into a WHERE class condition.

3. The method of claim 1, further comprising executing an action if at least one condition of the at least one business rule is met.

4. The method of claim 3, wherein the step of executing an action further comprises generating correspondence.

5. The method of claim 1, wherein the step of transmitting is initiated by a change to data stored in the database tier.

6. The method of claim 1, wherein the step of transmitting is initiated by a scheduling service.

7. The method of claim 6, wherein the scheduling service initiates the step of transmitting at predetermined intervals.

8. A system for preprocessing rules, the system comprising:
   a database server;
   an application server, the application server including:
   a business rules module for storing at least one business rule;
   a data manager for translating the at least one business rule to a Structured Query Language (SQL) query; and
   a query data service for transmitting the SQL query to the database server, wherein the SQL query comprises the translated at least one business rule;
   a communication link interoperably coupling the database server to the application server;
   wherein the database server evaluates the SQL query comprising the translated at least one business rule against data of the database server to determine whether the at least one business rule is satisfied;
   wherein the database server returns information indicative of the evaluation to the application server over the communication link; and
   wherein the database server and the application server are physically distinct servers.

9. The system of claim 8, wherein the SQL query is operable as a WHERE class condition.

10. The system of claim 8, wherein the application server further comprises a correspondence module for generating correspondence if the at least one business rule condition is met.

11. The system of claim 10, wherein correspondence is generated based on data matching the SQL query and a correspondence template.

12. The system of claim 8, wherein the application server further comprises a scheduling service for initiating, at predetermined intervals, transmission of at least one business rule to the data manager.

13. The system of claim 12, wherein the data manager is alerted to initiate translation of the at least one business rule based on information received from the scheduling service.

14. The system of claim 8, wherein the application server further comprises an auditlog manager for determining when a change to data of the database server has been made.

15. The system of claim 14, wherein the data manager is alerted to initiate translation of the at least one business rule based on actions detected by the auditlog manager.

16. The system of claim 8, wherein the system is implemented as a Service Oriented Architecture (SOA).

17. The system of claim 8, wherein the data is isolated to the database server.

18. A method for preprocessing business rules, the method comprising:
   in a service-oriented architecture comprising a client tier, a middle tier and a database tier, at the middle tier, initiating a business service for performing at least one action based on one or more of a plurality of records in the database tier that satisfy each of a plurality of stored business rules that are stored and provided by a business rules service in the middle tier;
   at the middle tier in the service-oriented architecture, translating the plurality of stored business rules provided by the business rules service into a Structured Query Language (SQL) query, each of the plurality of stored business rules specifying at least a condition;
   transmitting, via a query data service in the middle tier of the service-oriented architecture, the SQL query from the middle tier to the database tier to act on the plurality of records, wherein the SQL query comprises the plurality of stored business rules;
   receiving from the database tier at the business rules service in the middle tier selected ones of the plurality of records for which the plurality of stored business rules are determined to be satisfied;
   at the middle tier, performing the at least one action of the business service based on the selected ones of the plurality of records returned from the database tier; and
   wherein the middle tier and the database tier are physical divisions of the service-oriented architecture across a computer network, the middle tier and the database tier each comprising one or more server computers.

19. The method of claim 18, wherein each business rule of the plurality of stored business rule identifies a concept and an attribute, the attribute being subject to the condition.

20. The method of claim 19, wherein the transmitting step comprises utilizing a metadata service at the middle tier to map, for each business rule of the plurality of stored business rules, the concept to a table in the database tier and the attribute to a column of the table.

* * * * *